US012065865B2

(12) United States Patent
Harbrecht et al.

(10) Patent No.: US 12,065,865 B2
(45) Date of Patent: Aug. 20, 2024

(54) HINGE ASSEMBLY FOR WASHING OR LAUNDRY MACHINE

(71) Applicant: WHIRLPOOL CORPORATION, Benton Harbor, MI (US)

(72) Inventors: Ethan Harbrecht, La Porte, IN (US); Arunkumar Harikrishnasamy, Stevensville, MI (US); Ravindra Balkrishna Salunkhe, Maharashtra (IN)

(73) Assignee: Whirlpool Corporation, Benton Harbor, MI (US)

(*) Notice: Subject to any disclaimer, the term of this patent is extended or adjusted under 35 U.S.C. 154(b) by 303 days.

(21) Appl. No.: 17/536,888

(22) Filed: Nov. 29, 2021

(65) Prior Publication Data

US 2023/0167662 A1 Jun. 1, 2023

(51) Int. Cl.

*E05D 11/06* (2006.01)
*D06F 39/14* (2006.01)
*E05D 3/02* (2006.01)
*E05D 5/04* (2006.01)

(52) U.S. Cl.

CPC .............. *E05D 11/06* (2013.01); *D06F 39/14* (2013.01); *E05D 3/02* (2013.01); *E05D 5/04* (2013.01); *E05Y 2900/312* (2013.01)

(58) Field of Classification Search

CPC ..... E05Y 2900/312; E05D 3/02; E05D 11/06; D06F 39/14

See application file for complete search history.

(56) References Cited

U.S. PATENT DOCUMENTS 1,440,713 A * 1/1923 Ausbourne ............... E05D 5/10 16/324
2,929,093 A * 3/1960 Conlee .................... E05D 11/06 16/338
3,538,539 A * 11/1970 Clifford .................... E05D 5/14 16/375
3,822,440 A * 7/1974 Stansbury, Jr ...... E05D 11/1014 16/303
3,931,663 A * 1/1976 Holmes ................... E05D 5/046 16/DIG. 13
4,115,901 A * 9/1978 Schmidt .................. E05D 9/005 16/382
4,564,974 A * 1/1986 McGrail ............. E05D 11/1007 16/349

(Continued)

FOREIGN PATENT DOCUMENTS

CN 107059357 A 8/2017

*Primary Examiner* — Jason W San
(74) *Attorney, Agent, or Firm* — Brooks Kushman P.C.

(57) ABSTRACT

A hinge assembly for an appliance includes a base plate, a hinge plate, a shaft, a stop block, and a stop. The base plate has a first pair of spaced-apart eyelets. The hinge plate has a second pair of spaced-apart eyelets and a central eyelet disposed between the eyelets of the second pair of eyelets. The shaft extends through each eyelet of the first pair of spaced-apart eyelets, second pair of spaced-apart eyelets, and central eyelet. The hinge plate is configured to pivot relative to the base plate via the shaft. The stop block protrudes from a first eyelet of the first pair of spaced-apart eyelets. The stop extends from the central eyelet and is configured to engage the stop block to limit radial movement of the hinge plate relative to the base plate.

20 Claims, 7 Drawing Sheets

(56) References Cited

U.S. PATENT DOCUMENTS

| | | | | | |
|---|---|---|---|---|---|
| 4,819,299 | A * | 4/1989 | Holan | E05D 11/1014 16/296 |
| 4,891,862 | A * | 1/1990 | Holan | E05D 11/1014 16/334 |
| 5,463,795 | A * | 11/1995 | Carlson | E05D 11/00 16/385 |
| 8,307,513 | B1 * | 11/2012 | Fitzgerald | E05D 11/06 16/386 |
| 8,732,908 | B2 * | 5/2014 | Hatano | E05D 11/082 16/342 |
| 8,733,863 | B2 | 5/2014 | Kwak et al. | |
| 10,329,814 | B1 * | 6/2019 | Tamer | E05D 11/1007 |
| 10,738,520 | B2 * | 8/2020 | Cherry | E05D 11/06 |
| 11,674,346 | B2 * | 6/2023 | Sawyer | E05D 11/1007 16/351 |
| 2005/0204510 | A1 * | 9/2005 | Heimann | E05D 3/12 16/366 |
| 2007/0067959 | A1 * | 3/2007 | Smith | E05D 11/06 16/375 |
| 2012/0187811 | A1 * | 7/2012 | Kim | E05D 11/06 312/228 |
| 2014/0009049 | A1 | 1/2014 | Sung et al. | |
| 2014/0138147 | A1 * | 5/2014 | Takata | H02G 3/08 174/541 |
| 2014/0173852 | A1 * | 6/2014 | Heninger | E05D 5/14 16/375 |
| 2017/0121898 | A1 * | 5/2017 | Kwon | E05D 11/0081 |
| 2019/0186186 | A1 * | 6/2019 | Tamer | E05D 11/06 |
| 2020/0362504 | A1 * | 11/2020 | Li | E05D 3/02 |
| 2022/0364402 | A1 * | 11/2022 | Cardwell | E05D 11/1014 |
| 2023/0002953 | A1 * | 1/2023 | Harbrecht | E05D 5/04 |
| 2023/0167662 | A1 * | 6/2023 | Harbrecht | E05D 11/06 16/377 |

* cited by examiner

HINGE ASSEMBLY FOR WASHING OR LAUNDRY MACHINE

TECHNICAL FIELD

The present disclosure relates to washing or laundry machines.

BACKGROUND

Washing machines are configured to clean clothes and other garments. Washing machines may be top-loading or front-loading type washing machines.

SUMMARY

A laundry appliance includes a housing, a door, and a hinge. The hinge rotatably secures the door to the housing. The hinge has a base portion affixed to the housing, a rotatable portion secured to the door, a shaft, and a travel limiter. The rotatable portion is configured to pivot relative to the base portion via the shaft. The base portion has two eyelets and the rotatable portion has three eyelets. The eyelets of the base portion and the eyelets of the rotatable portion are aligned via the shaft extending therethrough. Each of the eyelets of the base portion are disposed between two of the eyelets of the rotatable portion. The travel limiter includes a stop disposed on the rotatable portion and a stop block disposed on the base portion. The stop is configured to engage the stop block to limit radial movement of the rotatable portion relative to the base portion.

A hinge assembly for an appliance includes a base plate, a hinge plate, a shaft, a stop block, and a stop. The base plate has a first pair of spaced-apart eyelets. The hinge plate has a second pair of spaced-apart eyelets and a central eyelet disposed between the eyelets of the second pair of eyelets. The shaft extends through each eyelet of the first pair of spaced-apart eyelets, second pair of spaced-apart eyelets, and central eyelet. The hinge plate is configured to pivot relative to the base plate via the shaft. The stop block protrudes from a first eyelet of the first pair of spaced-apart eyelets. The stop extends from the central eyelet and is configured to engage the stop block to limit radial movement of the hinge plate relative to the base plate.

A hinge assembly for a laundry appliance includes a base plate, a hinge plate, a shaft, a first stop block, a second stop block, a first stop, and a second stop. The base plate has a first set of spaced-apart eyelets. The hinge plate has a second set of spaced-apart eyelets. The shaft extends through each eyelet of the first and second sets of spaced-apart eyelets. The hinge plate is configured to pivot relative to the base plate via the shaft. The first and second stop blocks protrude from first and second eyelets of the first set of spaced-apart eyelets. The first and second stops extend from opposing sides of a first eyelet of the second set of spaced-apart eyelets. The first eyelet of the second set of spaced-apart eyelets is disposed between the first and second eyelets of the first set of spaced-apart eyelets. The first and second stops are configured to engage the first and second stop blocks to limit radial movement of the hinge plate relative to the base plate.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
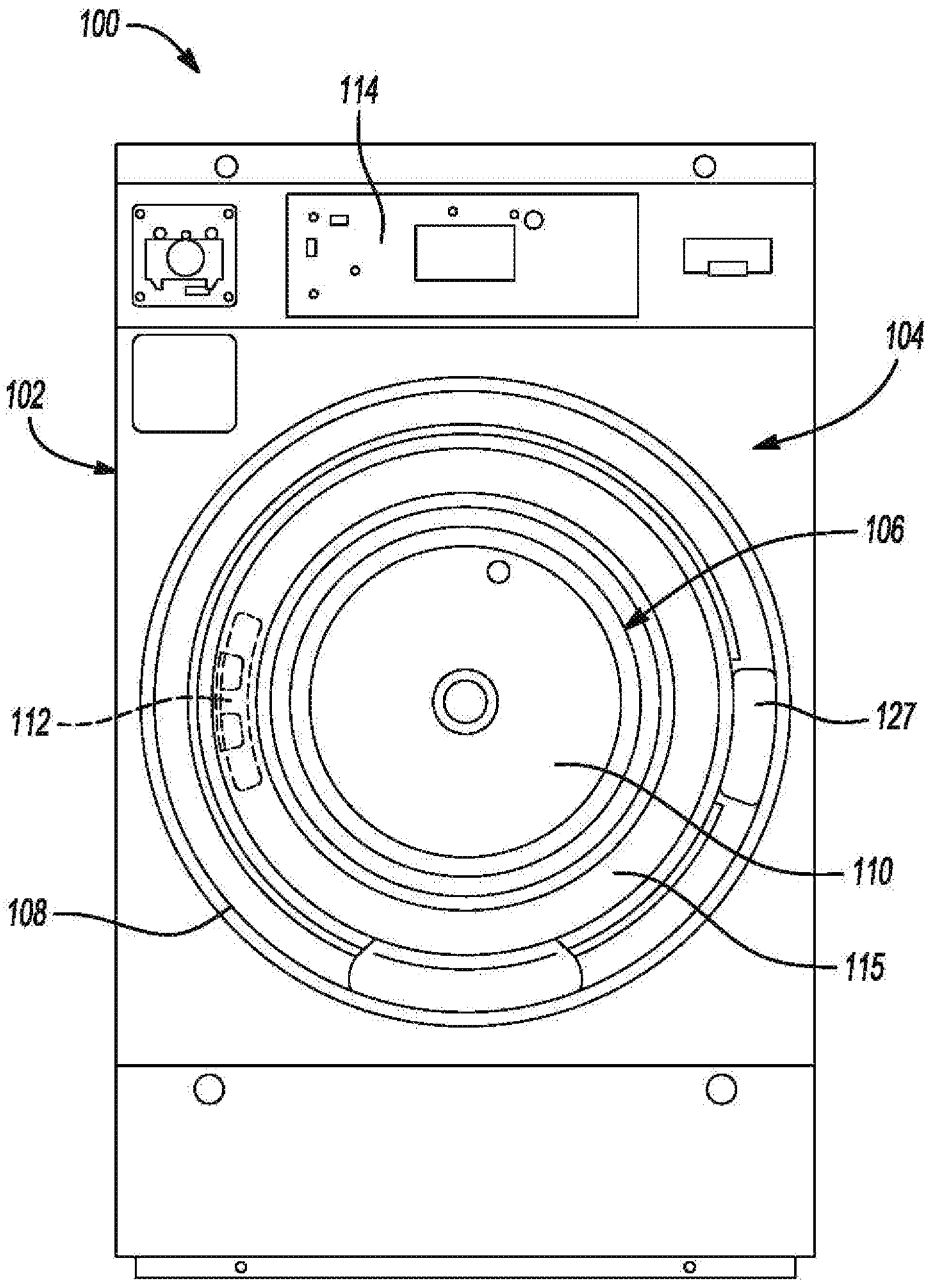
FIG. 1 illustrates a front elevational view of an appliance having a door in a closed position.
Figure 2:
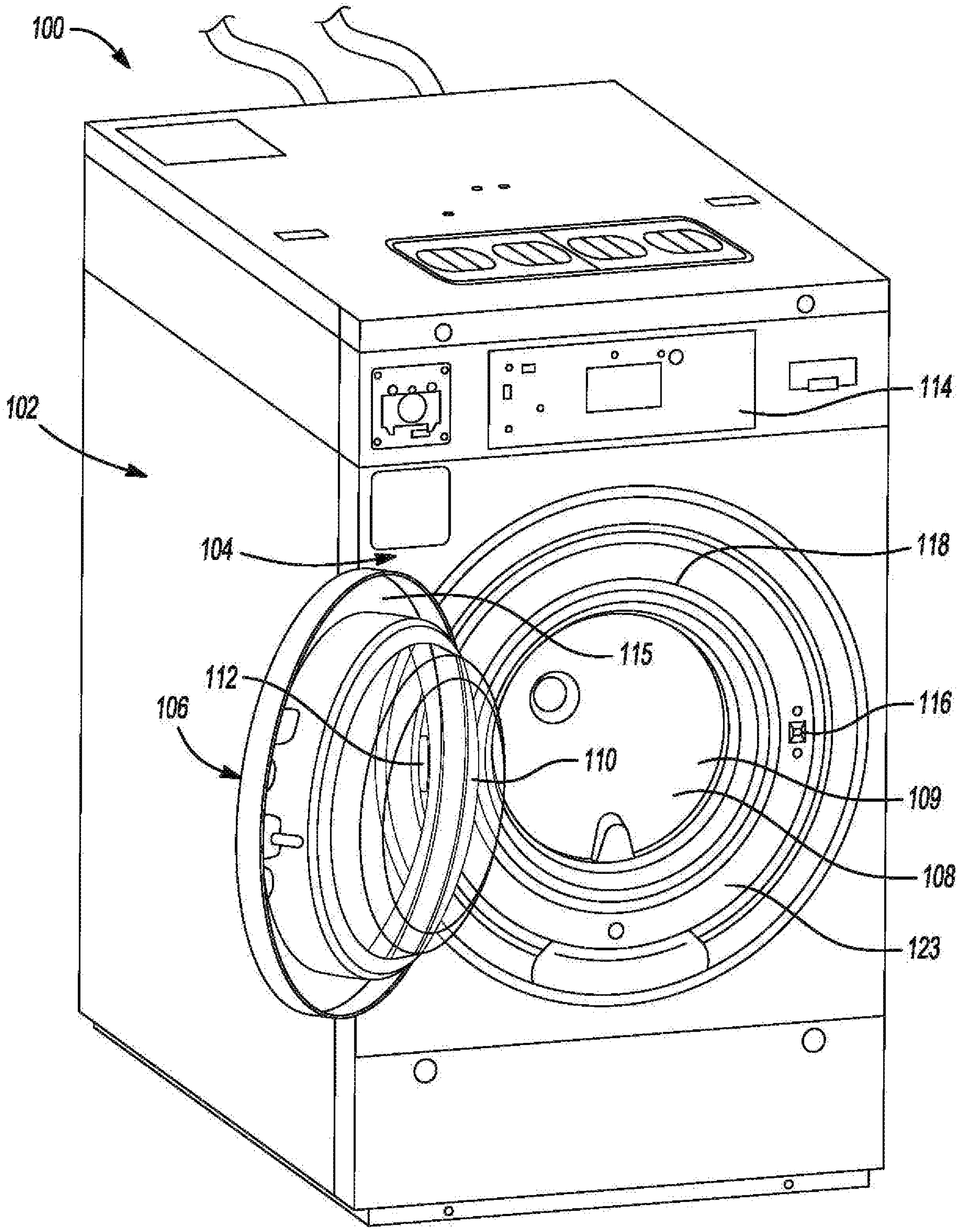
FIG. 2 illustrates a front perspective view of the appliance with the door in an open position.
Figure 3:
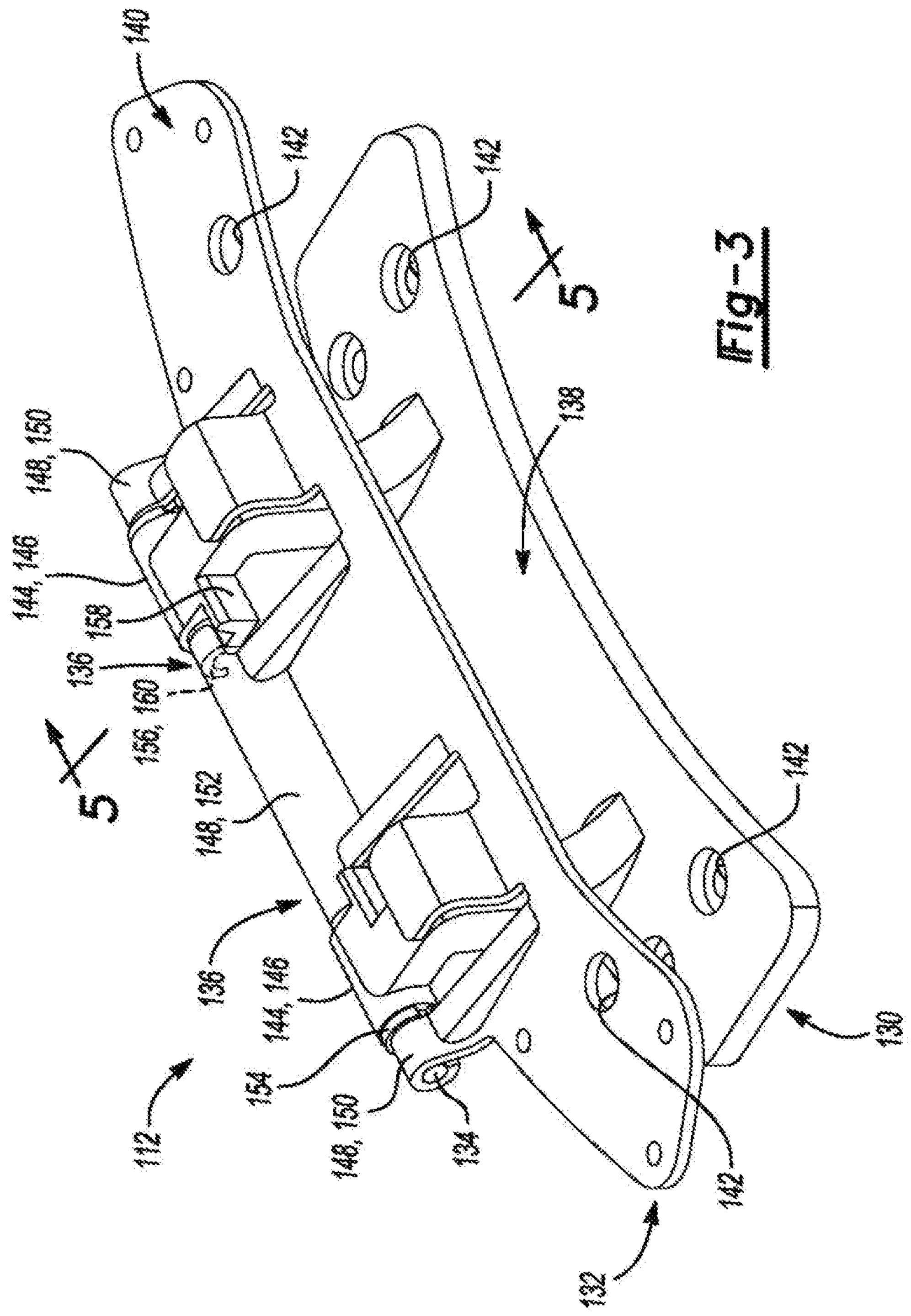
FIG. 3 is an isometric view of a hinge that is configured to rotatably secure the door to a housing of the appliance.
Figure 4:
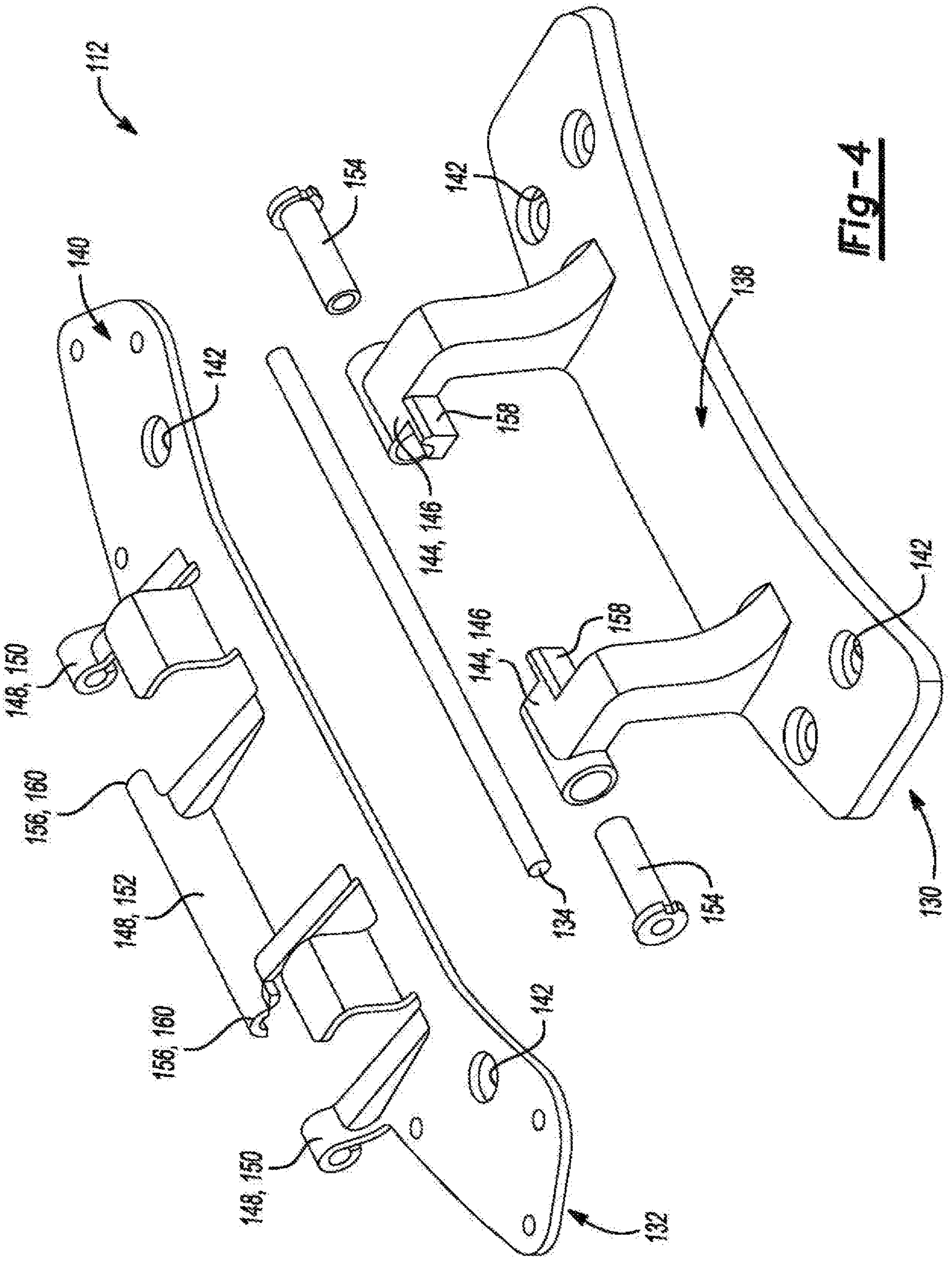
FIG. 4 is an exploded view of the hinge.

FIG. 1 illustrates a front elevational view of a commercial appliance 100 having a door 106 in a closed position. FIG. 2 illustrates a front perspective view of the appliance 100 with the door 106 in an open position. The commercial appliance 100 may be a laundry appliance 100 such as a washing machine or dryer, configured to treat laundry, such as by washing and/or drying clothes and other textiles and items. The laundry appliance 100 may more specifically be a front-loading washing machine or dryer. While the appliance 100 may be referred to as a laundry appliance throughout, the appliance 100 may include other appliances such as dishwashers, ice makers, freezers, refrigerators, among others, that include doors or other closable openings.

The appliance 100 may include a cabinet or housing 102 having a front panel 104. The housing 102 may house components typically found in a laundry appliance such as a laundry drum 109 (visible in FIG. 2) configured to receive laundry items, as well as a chassis, frame, motors, controls, fluid lines, sensors, vents, etc. The laundry drum 109 may be configured to receive laundry and rotate about an axis. In this example, the axis may be relatively horizontal. An access opening 108 may be defined in the front panel 104 to allow access to the drum 109. The access opening 108 may be selectively accessible via the door 106. The front panel 104 may be referred to as a door frame. The door 106 is secured to the front panel 104 and is configured to transition between an open position (e.g., FIG. 2) and a closed position (e.g., FIG. 1).

The door 106 may be rotatably attached to the housing 102, or more specifically the front panel 104, about the access opening 108 via at least one hinge assembly 112. The door 106 may rotate or pivot about the hinge assembly 112 between the open and closed positions. A latch 116 may be secured to the front panel 104 and may be arranged at or near the access opening 108 to latch or lock the door 106 in the closed position. The latch 116 may be arranged on an opposite side of the opening 108 relive to the hinge assembly 112.

The door 106 may define a window 110 or a clear substrate to allow users to see inside the drum 109. The window 110 may be a bowl-like shape, or semi-circular shape, or the window 110 may be flat. Depending on the type of appliance 100, the window 110 may be formed of plastic, or in the example of the appliance being a dryer, the window may be glass. The door 106 includes a frame 115 surrounding the window 110. The door 106 may include various seals and gaskets, as well as other structural portions such as collars, flanges, plates, harnesses, screws, etc.

The front panel 104 may include a recessed region 123 that surrounds the access opening 108. A gasket or seal 118 (e.g., a rubber or soft plastic seal) may be arranged around the inside of the recessed area 123 of the front panel 104 to create a hermetical seal against the door 106 when the door 106 is in a closed position. Stated in other terms, the seal 118 is configured to engage the door 106 to prevent fluid flow or transport between the door 106 and the front panel 104 proximate the recessed area 123 when the door is in the closed position. Alternatively, the seal 118 could be secured to the door 106 and could be configured to engage the front panel 104 to prevent fluid flow or transport between the door 106 and the front panel 104. In any configuration, the seal 118 is disposed between the door 106 and the front panel 104. The hinge assembly 112 may be attached to front panel 104 along the recessed region 123 or partially along the recess region 123. The recessed region 123 may more specifically form the door frame as opposed to the front panel 104 as a whole.

The appliance 100 may further include a controller coupled with various working components of the appliance 100 to control the operation of the working components and to implement one or more treating cycles of operation. The control system can further include a user interface 114 that is operably coupled with the controller. The user interface 114 can include one or more knobs, dials, switches, displays, touch screens and the like for communicating with the user, such as to receive input and provide output. The user can enter different types of information including, without limitation, cycle selection and cycle parameters, such as cycle options.

The controller can include the machine controller and any additional controllers provided for controlling any of the components of the appliance 100. For example, the controller can include the machine controller and a motor controller for operating a motor that rotates the drum 109. Many known types of controllers can be used for the controller. It is contemplated that the controller is a microprocessor-based controller that implements control software and sends/receives one or more electrical signals to/from each of the various working components to implement the control software. As an example, proportional control (P), proportional integral control (PI), and proportional derivative control (PD), or a combination thereof, a proportional integral derivative control (PID), can be used to control the various components of the appliance 100.

The controller can be provided with a memory and a central processing unit (CPU). The memory can be used for storing the control software that can be executed by the CPU in completing a cycle of operation using the appliance 100 and any additional software. Examples, without limitation, of treating cycles of operation include: wash, heavy-duty wash, delicate wash, quick wash, pre-wash, refresh, rinse only, and timed wash, which can be selected at the user interface 114. The memory can also be used to store information, such as a database or table, and to store data received from the one or more components of the appliance 100 that can be communicably coupled with the controller. The database or table can be used to store the various operating parameters for the one or more cycles of operation, including factory default values for the operating parameters and any adjustments to them by the control system or by user input.

The controller may comprise a single controller or may be part of a larger control system and may control or be controlled by various other controllers throughout the appliance 100. It should therefore be understood that the controller and one or more other controllers can collectively be referred to as a "controller" that controls various subcomponents or actuators of the appliance 100 in response to signals from various subcomponents or sensors of the appliance 100 to control various functions. The controller may include the microprocessor or central processing unit (CPU), which may be in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the appliance 100.

Referring to FIGS. 3-6, the hinge 112 that is configured rotatably attach the door 106 to the housing 102 is illustrated in further detail. The hinge 112 has a base portion 130 that may be secured to the housing 102, a rotatable portion 132 that may be secured to the door 106, a shaft 134, and at least one travel limiter 136. The base portion 130 may more specifically include a base plate 138 that may be secured to the housing 102 and the rotatable portion 132 may include a hinge plate 140 that may be secured to the door 106. The base plate 138 and the hinge plate 140 may each define orifices 142 configured to receive fasteners to secure the base plate 138 to the housing 102 and to secure the hinge plate 140 to the door 106, respectively.

The base portion 130 has a first set of spaced-apart eyelets 144. More specifically, the first set of spaced-apart eyelets 144 may extend from the base plate 138. Stated in other terms, the base plate 138 may be said to have the first set of spaced-apart eyelets 144. The first set of spaced-apart eyelets 144 may comprise a first pair of spaced-apart eyelets 146. The rotatable portion 132 has a second set of spaced-apart eyelets 148. More specifically, the second set of spaced-apart eyelets 148 may extend from the hinge plate 140. Stated in other terms, the hinge plate 140 may be said to have the second set of spaced-apart eyelets 148. The second set of spaced-apart eyelets 148 may comprise a second pair of spaced-apart eyelets 150 and a central eyelet 152 that is disposed between the eyelets of the second pair of eyelets 150.

The shaft 134 extends through each eyelet of the first and second sets of spaced-apart eyelets 144, 148. Each eyelet of the first and second sets of spaced-apart eyelets 144, 148 are aligned via the shaft 134 extending therethrough. The rotatable portion 132 is configured to pivot relative to the base portion 130 via the shaft 134. Also, the hinge plate 140 is configured to pivot relative to the base plate 138 via the shaft 134. Each eyelet of the first set of spaced-apart eyelets 144 are disposed between two of the eyelets of the second set of spaced-apart eyelets 148. More specifically, each eyelet of the first set of spaced-apart eyelets 144 is disposed between one eyelet of the second pair of spaced-apart eyelets 150 and the central eyelet 152. The central eyelet 152 is disposed between the eyelets of the first pair of spaced-apart eyelets 146 from the first set of spaced-apart eyelets 144.

Bushings 154 may be disposed within each eyelet of the first set of spaced-apart eyelets 144. The shaft 134 may more specifically be disposed within the bushings 154. Even more specifically, the shaft 134 may be disposed within the bushings 154 via a slip-fit configuration and may be disposed within at least one of the eyelets of the second set of spaced-apart eyelets 148 via a press-fit configuration.

Each travel limiter 136 includes a stop 156 disposed on the rotatable portion 132 and a stop block 158 disposed on the base portion 130. More specifically, first and second stop blocks 158 may protrude inward from first and second eyelets of the first set of spaced-apart eyelets 144, and first and second stops 156 may extend about the shaft 134, and in a direction of an axis of rotation of the shaft 134, and outward from opposing sides of the central eyelet 152 of the second set of spaced-apart eyelets 148. Each stop 156 is configured to engage one of the stop blocks 158 to limit radial movement of the rotatable portion 132 relative to the base portion 130, or more specifically to limit radial movement of the hinge plate 140 relative to the base plate 138. Even more specifically, the first and second stops 156 are configured to engage the first and second stop blocks 158, respectively, to limit radial movement of the rotatable portion 132 relative to the base portion 130, or more specifically to limit radial movement of the hinge plate 140 relative to the base plate 138.

Figure 5:
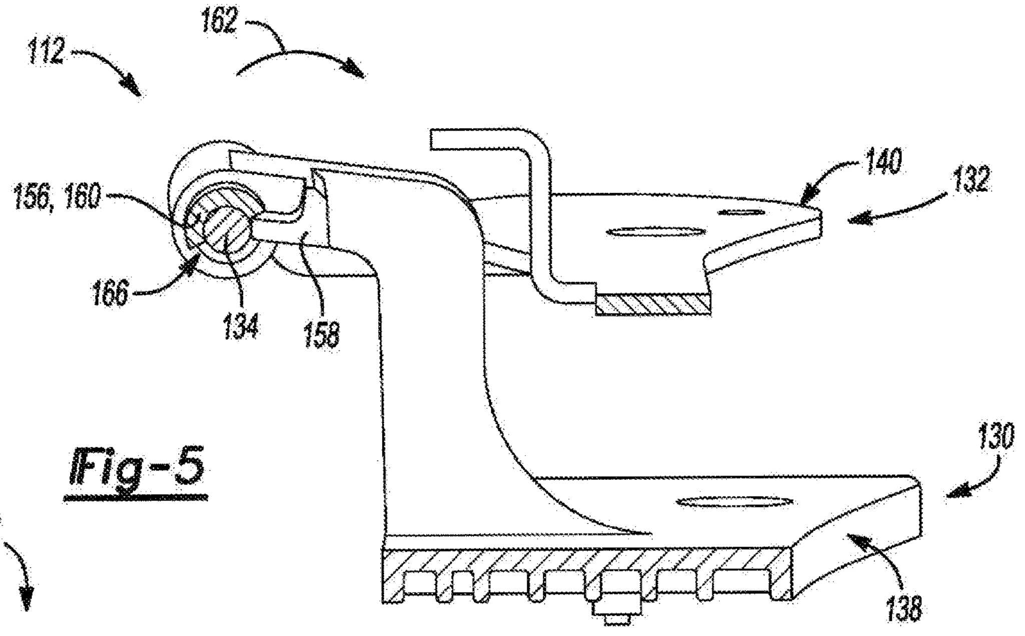
FIG. 5 is a cross-sectional view taken along line 5-5 of FIG. 3 with the hinge in a closed position.
Figure 6:
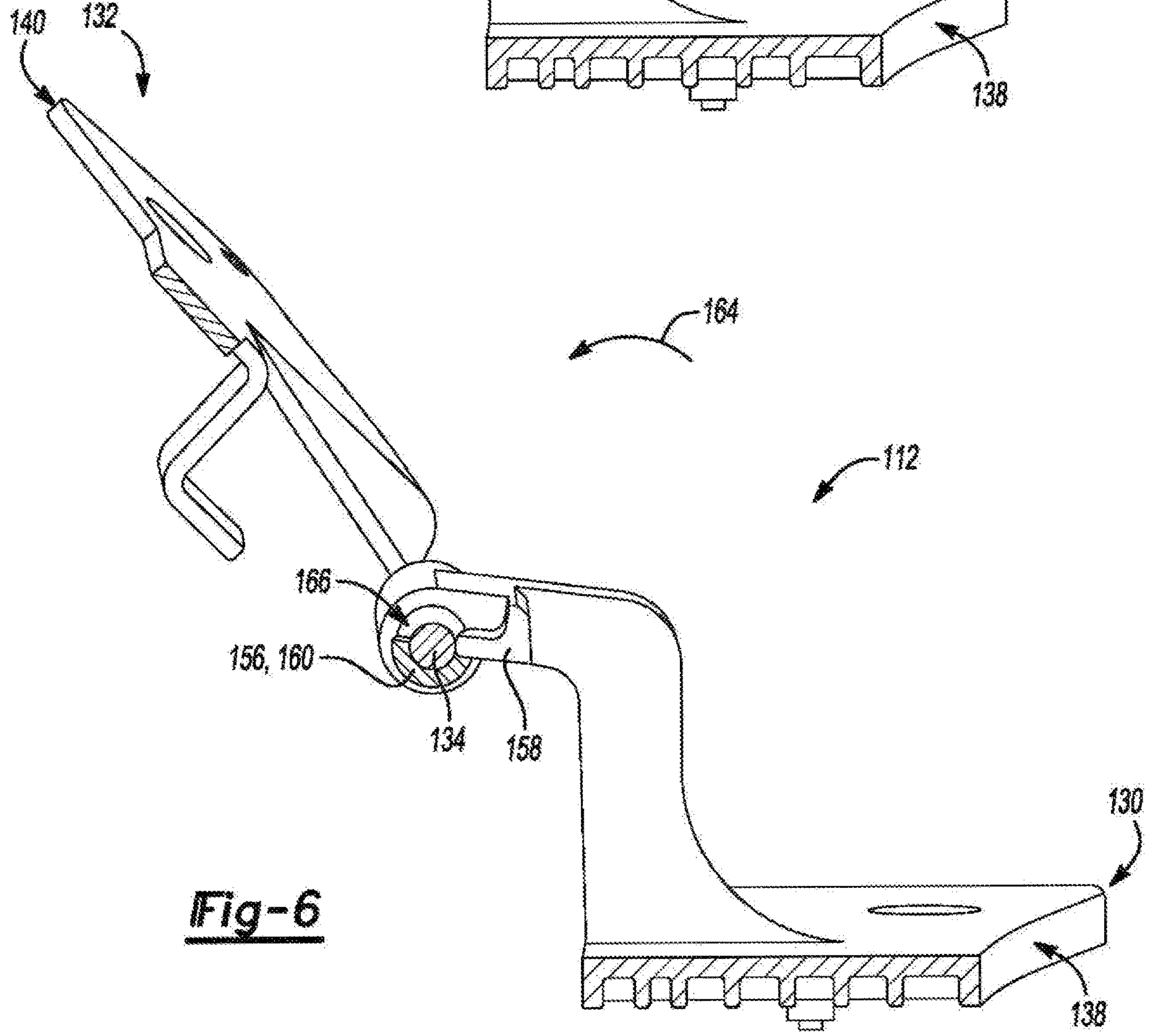
FIG. 6 is a cross-sectional view taken along line 5-5 of FIG. 3 with the hinge in an open position.
Figure 7:
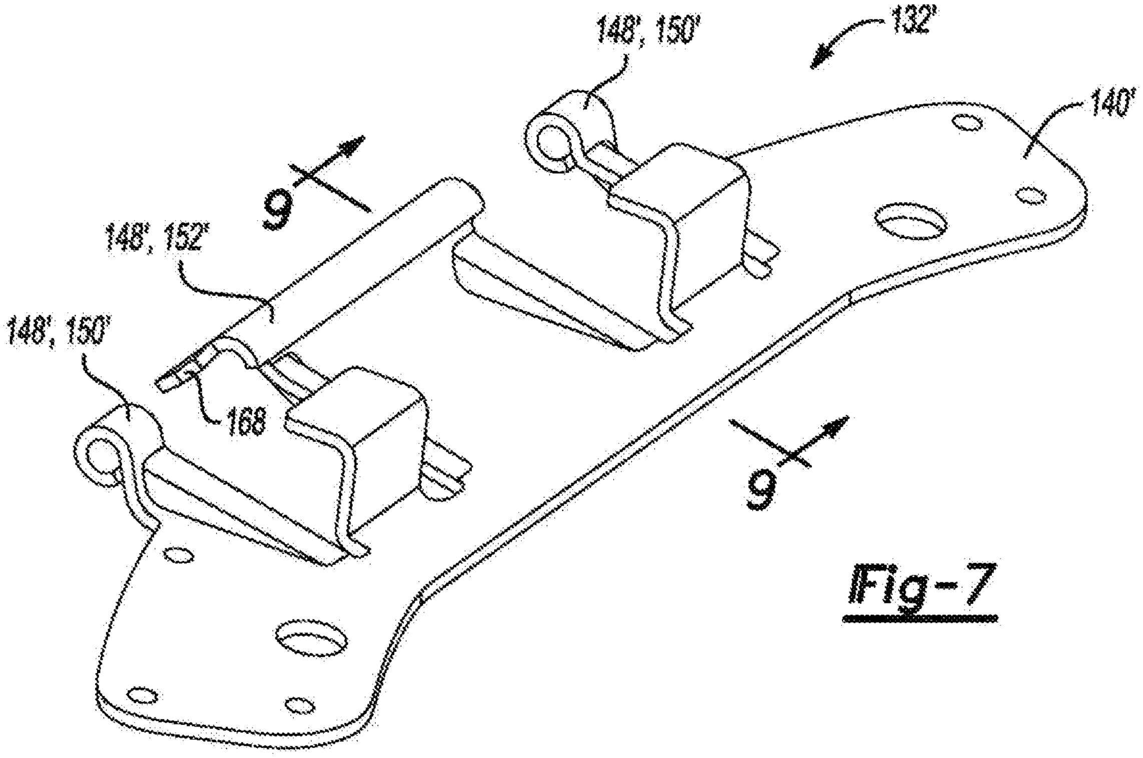
FIG. 7 is an isometric view of an alternative embodiment of a rotatable portion of an alternative embodiment of the hinge.
Figure 8:
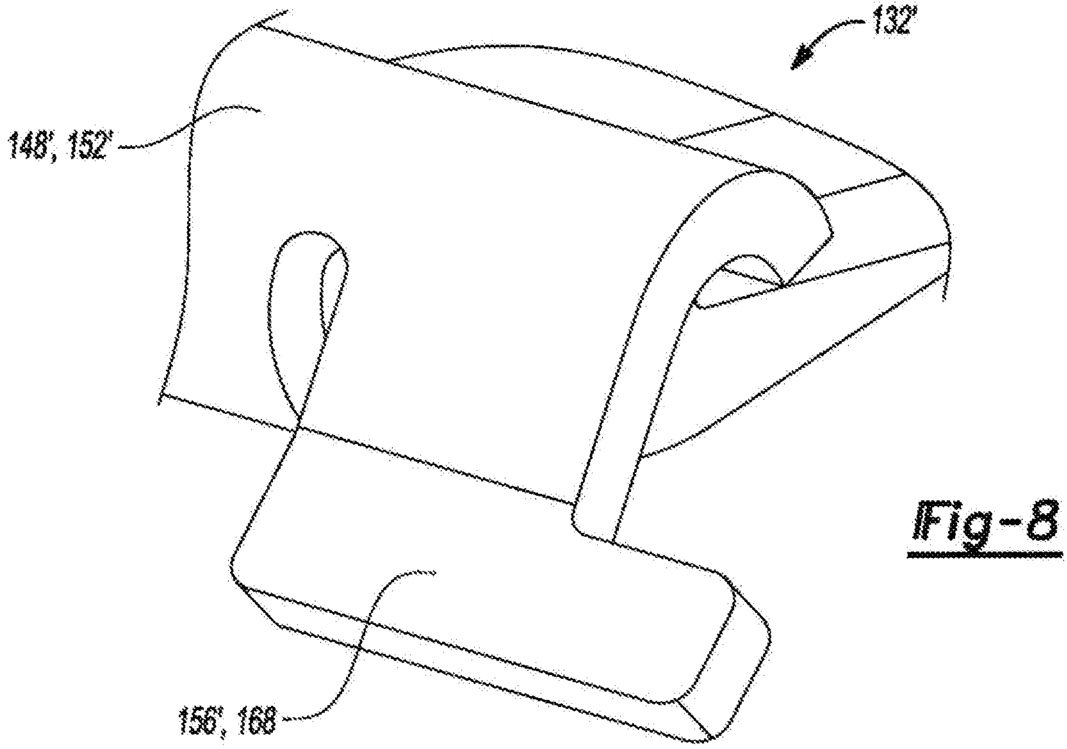
FIG. 8 is a partial isometric view of the alternative embodiment of the rotatable portion including an alternative embodiment of a travel limiter.
Figure 9:
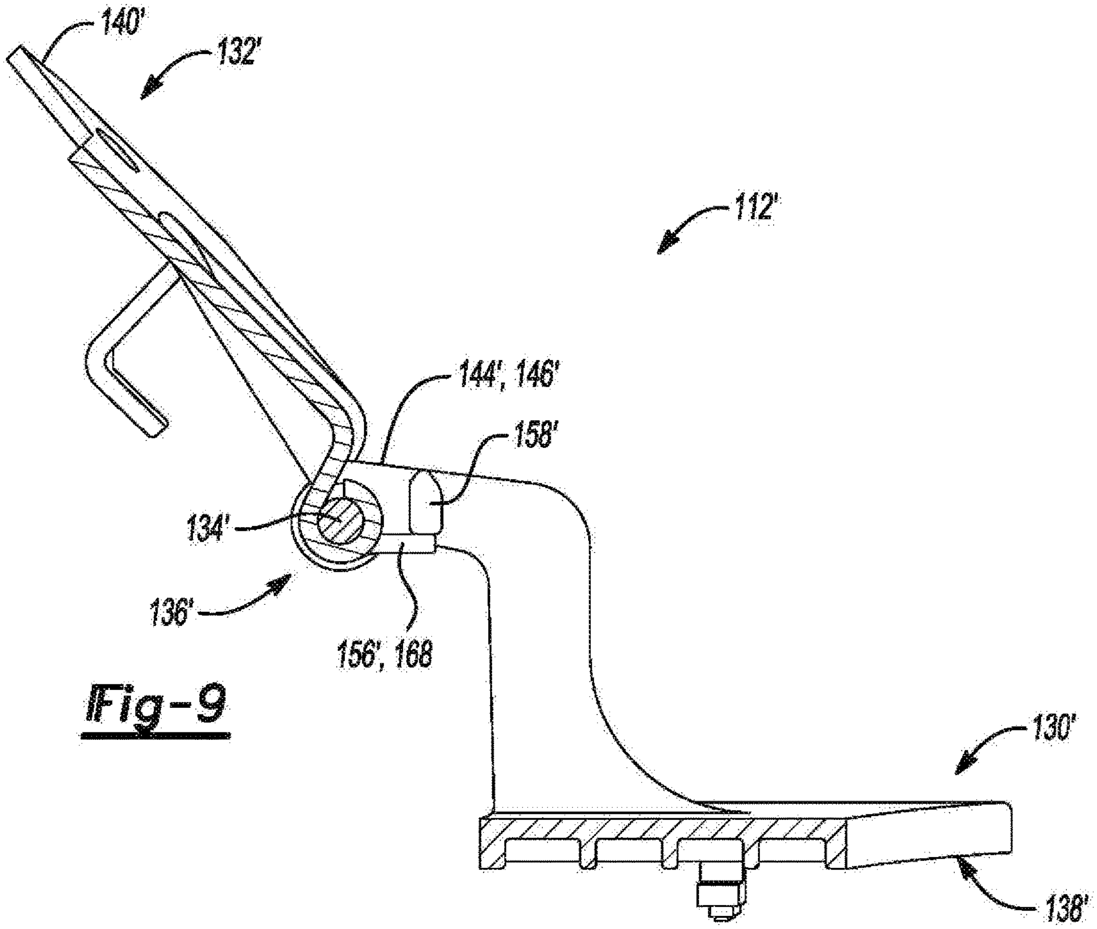
FIG. 9 is a cross-sectional view of the alternative embodiment of the rotatable portion taken along line 9-9 of FIG. 7, with the alternative embodiment of the rotatable portion secured to an alternative embodiment of a base portion and with the alternative embodiment of the hinge in an open position.
Figure 10:
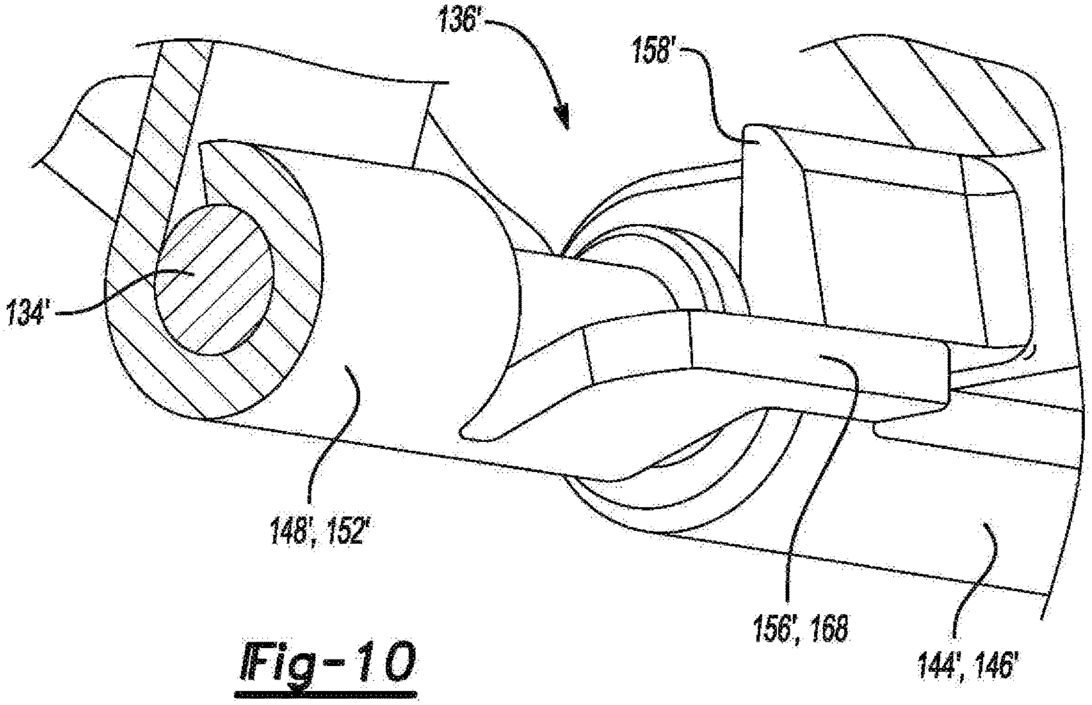
FIG. 10 is a partial isometric cross-sectional view taken along line 9-9 of FIG. 7 illustrating the alternative embodiment of the travel limiter.

Each stop 156 may be a partial ring 160 that is configured to engage a stop block 158 to limit radial movement of the rotatable portion 132 relative to the base portion 130, or more specifically to limit radial movement of the hinge plate 140 relative to the base plate 138. When rotated in a first direction 162 the partial ring 160 is configured to engage a top of the stop block 158 to limit radial movement of the rotatable portion 132 relative to the base portion 130 (e.g., FIG. 5). When rotated in a second direction 164, the partial ring 160 is configured to engage a bottom of the stop block 158 to limit radial movement of the rotatable portion 132 relative to the base portion 130 (e.g., FIG. 6). Each partial ring 160 defines a notch or open end 166 and one of the stops blocks 158 is disposed in the open end 166 defined by each partial ring 160. Each partial ring 160 may be concentric with the shaft 134. FIG. 5 illustrates the hinge 112 in a closed position, which corresponds with the door 106 being in a closed position (e.g., FIG. 1). FIG. 6 illustrates the hinge 112 in an open position, which corresponds with the door 106 being in an open position (e.g., FIG. 2).

Referring to FIGS. 7-10, an alternative embodiment of the hinge 112' is illustrated. It should be understood that hinge 112' has all the same subcomponents and functionality as hinge 112 unless otherwise stated or illustrated herein. Furthermore, it should be understood that any component having a callout number in FIGS. 7-10 that includes a prime symbol (') should be construed as having the same structure and functionality as a component illustrated in FIGS. 3-6 that includes the same callout number but without the prime symbol, unless otherwise stated or illustrated herein. The hinge 112' has a base portion 130' that may be secured to the housing 102, a rotatable portion 132' that may be secured to the door 106, a shaft 134', and at least one travel limiter 136'. The base portion 130' may more specifically include a base plate 138' that may be secured to the housing 102 and the rotatable portion 132' may include a hinge plate 140' that may be secured to the door 106.

The base portion 130' has a first set of spaced-apart eyelets 144'. More specifically, the first set of spaced-apart eyelets 144' may extend from the base plate 138'. Stated in other terms, the base plate 138' may be said to have the first set of spaced-apart eyelets 144'. The first set of spaced-apart eyelets 144' may comprise a first pair of spaced-apart eyelets 146'. The rotatable portion 132' has a second set of spaced-apart eyelets 148'. More specifically, the second set of spaced-apart eyelets 148' may extend from the hinge plate 140'. Stated in other terms, the hinge plate 140' may be said to have the second set of spaced-apart eyelets 148'. The second set of spaced-apart eyelets 148' may comprise a second pair of spaced-apart eyelets 150' and a central eyelet 152' that is disposed between the eyelets of the second pair of eyelets 150'. The shaft 134' extends through each eyelet of the first and second sets of spaced-apart eyelets 144', 148'.

A first difference between hinge 112 and hinge 112' is that hinge 112 includes stop blocks 158 that are L-shaped while hinge 112' includes stop blocks 158' that only extend in one direction. A second difference between hinge 112 and hinge 112' is that hinge 112 includes stops 156 that are comprised of the partial rings 160 while hinge 112' includes stops 156' that are comprised of flaps 168 that are configured to engage the stop blocks 158' to limit radial movement of the rotatable portion 132' relative to the base portion 130', or more specifically to limit radial movement of the hinge plate 140' relative to the base plate 138'. The flaps 168 are disposed about the shaft 134' and one flap 168 may extend from each longitudinal end of the central eyelet 152' of the second set of spaced-apart eyelets 148'.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A laundry appliance comprising:
- a housing;
- a door; and
- a hinge rotatably securing the door to the housing, the hinge having a base portion affixed to the housing, a rotatable portion secured to the door, a shaft, and a travel limiter, wherein (i) the rotatable portion is configured to pivot relative to the base portion via the shaft, (ii) the base portion has two eyelets and the rotatable portion has three eyelets, (iii) the eyelets of the base portion and the eyelets of the rotatable portion are aligned via the shaft extending therethrough, (iv) each of the eyelets of the base portion are disposed between two of the eyelets of the rotatable portion, (v) the travel limiter includes a stop disposed on the rotatable portion and a stop block disposed on the base portion, and (vi) the stop is configured to engage the stop block to limit radial movement of the rotatable portion relative to the base portion.

2. The appliance of claim 1, wherein the stop includes a partial ring that is configured to engage the stop block to limit radial movement of the rotatable portion relative to the base portion.

3. The appliance of claim 2, wherein (i) the partial ring defines an open end and (ii) the stop block is disposed within the open end.

4. The appliance of claim 2, wherein the partial ring (i) is disposed about the shaft and (ii) extends in a direction along an axis of the shaft from at least one of the eyelets of the rotating portion.

5. The appliance of claim 2, wherein the partial ring (i) is disposed about the shaft and (ii) extends in a direction along an axis of the shaft from a middle of the three eyelets of the rotating portion.

6. The appliance of claim 1, wherein the stop includes a flap that is configured to engage the stop block to limit radial movement of the rotatable portion relative to the base portion.

7. The appliance of claim 6, wherein the flap (i) is disposed about the shaft and (ii) extends from at least one of the eyelets of the rotating portion.

8. The appliance of claim 6, wherein the flap (i) is disposed about the shaft and (ii) extends from a middle of the three eyelets of the rotating portion.

9. A hinge assembly for an appliance comprising:
- a base plate having a first pair of spaced-apart eyelets;
- a hinge plate having (i) a second pair of spaced-apart eyelets and (ii) a central eyelet disposed between the eyelets of the second pair of eyelets;
- a shaft extending through each eyelet of the first pair of spaced-apart eyelets, second pair of spaced-apart eyelets, and central eyelet, wherein the hinge plate is configured to pivot relative to the base plate via the shaft;
- a stop block protruding from a first eyelet of the first pair of spaced-apart eyelets; and
- a stop (i) extending from the central eyelet and (ii) configured to engage the stop block to limit radial movement of the hinge plate relative to the base plate.

10. The hinge assembly of claim 9, wherein the stop includes a partial ring that is configured to engage the stop block to limit radial movement of the hinge plate relative to the base plate.

11. The hinge assembly of claim 10, wherein (i) the partial ring defines an open end and (ii) the stop block is disposed within the open end.

12. The hinge assembly of claim 10, wherein the partial ring (i) is concentric with the shaft and (ii) extends in a direction along an axis of the shaft from the central eyelet.

13. The hinge assembly of claim 9, wherein the stop includes a flap that (i) extends from the central eyelet and (ii) is configured to engage the stop block to limit radial movement of the hinge plate relative to the base plate.

14. A hinge assembly for a laundry appliance comprising:
- a base plate having a first set of spaced-apart eyelets;
- a hinge plate having a second set of spaced-apart eyelets;
- a shaft extending through each eyelet of the first and second sets of spaced-apart eyelets, wherein the hinge plate is configured to pivot relative to the base plate via the shaft;
- first and second stop blocks protruding from first and second eyelets of the first set of spaced-apart eyelets; and
- first and second stops extending from opposing sides of a first eyelet of the second set of spaced-apart eyelets, wherein (i) the first eyelet of the second set of spaced-apart eyelets is disposed between the first and second eyelets of the first set of spaced-apart eyelets and (ii) the first and second stops are configured to engage the first and second stop blocks, respectively, to limit radial movement of the hinge plate relative to the base plate.

15. The hinge assembly of claim 14, wherein the first and second stops include first and second partial rings, respectively, that are configured to engage the first and second stop blocks, respectively, to limit radial movement of the hinge plate relative to the base plate.

16. The hinge assembly of claim 15, wherein the first and second partial rings define first and second open ends, respectively.

17. The hinge assembly of claim 16, wherein the first and second stop blocks are disposed within the first and second open ends, respectively.

18. The hinge assembly of claim 15, wherein the first and second partial rings (i) are disposed about and centric to the shaft and (ii) extend in opposing directions along an axis of the shaft from opposing ends of the first eyelet of the second set of spaced-apart eyelets.

19. The hinge assembly of claim 14, wherein the first and second stops include first and second flaps that are configured to engage the first and second stop blocks, respectively, to limit radial movement of the hinge plate relative to the base plate.

20. The hinge assembly of claim 19, wherein the first and second flaps are disposed about the shaft on opposing ends of the first eyelet of the second set of spaced-apart eyelets.

* * * * *